(12) United States Patent　(10) Patent No.: US 10,371,826 B2
Moore　(45) Date of Patent: Aug. 6, 2019

(54) WATER-BASED RADIATION DETECTOR

(71) Applicant: Morpho Detection, LLC, Newark, CA (US)

(72) Inventor: Jared William Moore, Oakland, CA (US)

(73) Assignee: MORPHO DETECTION, LLC, Newark, CA (US)

( * ) Notice: Subject to any disclaimer, the term of this patent is extended or adjusted under 35 U.S.C. 154(b) by 35 days.

(21) Appl. No.: 15/472,917

(22) Filed: Mar. 29, 2017

(65) Prior Publication Data

US 2018/0284295 A1　Oct. 4, 2018

(51) Int. Cl.
　　*G01T 1/185*　(2006.01)
(52) U.S. Cl.
　　CPC ................... *G01T 1/185* (2013.01)
(58) Field of Classification Search
　　CPC ....................................... G01T 1/185
　　See application file for complete search history.

(56) References Cited

U.S. PATENT DOCUMENTS 3,925,212 A * 12/1975 Tchernev ............... C25B 1/003
　　　　　　　　　　　　　　　　　　　　204/278
9,087,641 B2　7/2015 Pollack
2009/0226798 A1　9/2009 Pollack
2012/0126135 A1 * 5/2012 Illemann ................. G01T 1/02
　　　　　　　　　　　　　　　　　　　　　250/394
2015/0361563 A1　12/2015 Pollack et al.
2015/0364781 A1 * 12/2015 Kwon .................. H01M 14/00
　　　　　　　　　　　　　　　　　　　　　　429/5
2017/0184730 A1 * 6/2017 Zygmanski ............ G01T 1/208

OTHER PUBLICATIONS

Ovchinnikova K., Pollack, "Can water store charge?". Langmuir 25(1):542-547 (Jan. 2009).

* cited by examiner

*Primary Examiner* — Christine S. Kim
(74) *Attorney, Agent, or Firm* — Armstrong Teasdale LLP (57) ABSTRACT

A radiation detector includes a housing configured to contain a volume of water, the housing including an interior surface adjacent a first portion of the water having a first net charge. The radiation detector also includes a first electrode coupled to the housing within the first portion of the water, and a second electrode coupled to the housing within a second portion of the water adjacent the first portion of the water. The radiation detector further includes a current detector connected in series between the first electrode and the second electrode, the current detector configured to detect a current associated with an ionized radiation product that enters the housing.

18 Claims, 10 Drawing Sheets

WATER-BASED RADIATION DETECTOR

BACKGROUND

The embodiments described herein relate generally to detecting radiation, and more particularly, to a water-based radiation detector.

At least some known passenger screening systems detect contraband. As used herein, the term "contraband" refers to illegal substances, explosives, narcotics, weapons, a threat object, and/or any other material that a person is not allowed to possess in a restricted area, such as an airport. Contraband detection may involve a combination of sensors and structures to control a flow of passengers and/or cargo. Contraband may also include objects that can be carried in exempt or licensed quantities intended to be used outside of safe operational practices, such as the construction of dispersive radiation devices.

One apparatus for detecting contraband is a radiation detector. Radiation detectors may detect alpha, beta, positron, fast electron, neutron and/or gamma ray radiation to identify one or more radionuclides in a radiation source. At least some known radiation detectors include ionizing gas chambers, direct-absorption semiconductors, and indirect detectors that use a scintillating material connected to a semiconductor or photomultiplier tube (PMT). However, these known detectors have certain disadvantages. For instance, ionizing gas chambers exhibit low absorption of radiation due to the low density of the gas medium therein through which radiation products travel. Moreover, PMTs used in indirect radiation detectors are expensive, as are direct-absorption semiconductor detectors.

BRIEF SUMMARY

In one aspect, a radiation detector is provided. A radiation detector includes a housing configured to contain a volume of water. The housing includes an interior surface adjacent a first portion of the water having a first net charge. The radiation detector also includes a first electrode coupled to the housing within the first portion of the water, and a second electrode coupled to the housing within a second portion of the water adjacent the first portion of the water. The radiation detector further includes a current detector connected in series between the first electrode and the second electrode, the current detector configured to detect a current associated with an ionized radiation product that enters the housing.

In another aspect, a method for constructing a radiation detector is provided. The method includes dispensing a volume of water into a housing configured to contain the water, wherein the housing includes an interior surface adjacent a first portion of the water. The method also includes positioning a first electrode within the first portion of the water, and positioning a second electrode within a second portion of the water adjacent the first portion of the water. The method further includes connecting a current detector in series between the first electrode and the second electrode, wherein the current detector is configured to detect a current associated with an ionized radiation product that enters the housing.

In a further aspect, a radiation detector is provided. The radiation detector includes a housing configured to contain a volume of water. The housing includes an interior surface adjacent a first portion of the water having a first net charge. The radiation detector also includes a circuit formed through the first portion of water and a second portion of water adjacent the first portion of water. The second portion of water has a second net charge with a polarity opposite the first net charge. The circuit includes a current detector configured to detect a flow of charge from one of the first and second portions of water to the other of the first and second portions of water.

In yet another aspect, a radiation detector is provided. The radiation detector includes a plurality of detector elements arranged in an array. Each detector element includes a housing configured to contain a volume of water. The housing includes an interior surface adjacent a first portion of the water having a first net charge. The radiation detector also includes a first electrode coupled to the housing within the first portion of the water, and a second electrode coupled to the housing within a second portion of the water adjacent the first portion of the water. The radiation detector further includes a current detector connected in series between the first electrode and the second electrode, the current detector configured to detect a current associated with an ionized radiation product that enters the housing.

DETAILED DESCRIPTION

The systems and methods described herein provide a cost-effective water-based radiation detector. The radiation detector includes a housing configured to contain a volume of water. The housing includes a surface (e.g., a hydrophilic or hydrophobic surface) configured to structure the water adjacent to the surface. As described herein, the structured water creates an exclusion zone with a net charge that in turn forms an adjacent region with an opposite net charge, creating an electric field therebetween. A first electrode is placed in the exclusion zone, and a second electrode is placed in the adjacent region of the water. When a free charge or ion (e.g., from an ionizing radiation product) enters the electric field, the electric field forces the free charge or ion to move, creating a current. The current is detected, indicating that radiation is present in the vicinity of the radiation detector. Using water as a radiation detector is not only cost effective, as water is less expensive than semiconductors and/or PMTs used in alternative radiation detectors, but also provides higher density, and therefore improved absorption efficiency, over gas-based radiation detectors.

Water, as a polar molecule, adheres in a structured way to either a hydrophilic or hydrophobic surface creating what is known as an exclusion zone (named for its ability to exclude solutes), which in turn induces a charge separation. Structured water near such a surface is typically referred to as "exclusion zone water" or "EZ water."

In addition, ionizing radiation, such as x-rays and gamma-rays generated by a radiation source that includes radioactive material, probabilistically creates free charges and ions when such radiation interacts with matter, through known mechanisms including the photoelectric effect, Compton scattering, and/or pair production.

Figure 1:
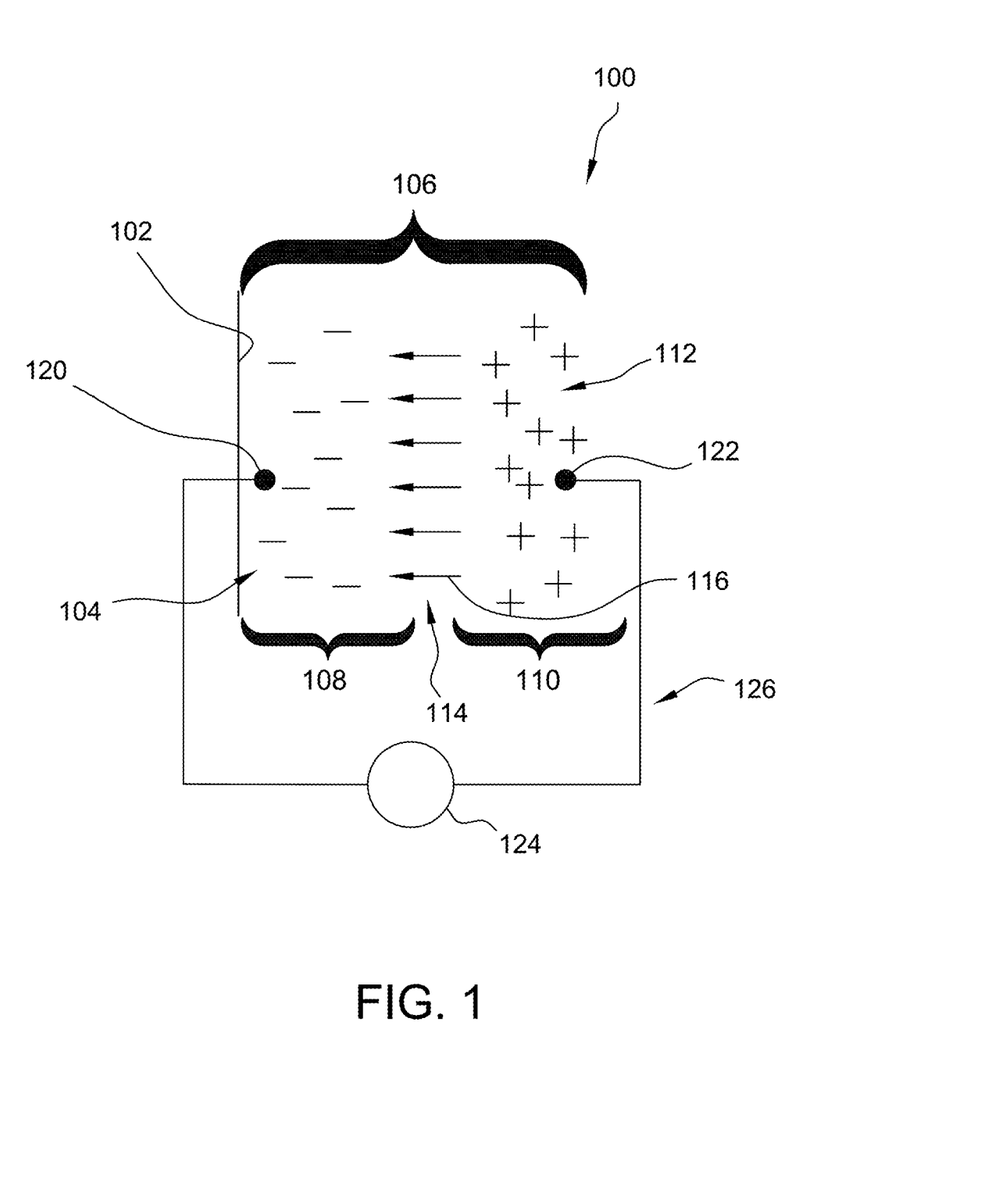
FIG. 1 is a diagram of an exemplary water-based radiation detector using a hydrophilic surface to create a negatively charged exclusion zone.

With reference now to the figures, FIG. 1 is a diagram of an exemplary water-based radiation detector 100 that includes a hydrophilic surface 102 to create a negatively charged exclusion zone 104 (referred to herein as "negative exclusion zone 104"). Water 106 adheres to hydrophilic surface 102 to form structured water 108, thereby forming negative exclusion zone 104. Structured water 108 in negative exclusion zone 104 has a net negative charge. Accordingly, positive charge is forced from negative exclusion zone 104 into "bulk water" 110 in an adjacent water region 112 (a "positive water region" 112) just outside of negative exclusion zone 104. A separation of charge in a region 114 between negative exclusion zone 104 and positive water region 112 generates an electric field 116. Specifically, electric field 116 is generated between negative charge in negative exclusion zone 104 and positive charge in positive water region 112.

Radiation detector 100 further includes a first electrode 120 and a second electrode 122, as well as a current detector 124 connected in series between first electrode 120 and second electrode 122. In the illustrated embodiment, first electrode 120 is positioned within negative exclusion zone 104, and second electrode 122 is positioned within bulk water 110. More particularly, second electrode 122 is positioned within positive water region 112 of bulk water 110. In the exemplary embodiment, the current detector 124 includes an ammeter. A circuit 126 between first electrode 120 and second electrode 122 is formed through water 106.

Electric field 116 behaves very similarly to a depletion region in a semiconductor photodiode. More particularly, any free charge or ion, such as those generated by a radiation source, that enter into a separation of charge region 114 will be swept or forced out of region 114 by electric field 116. Such movement of the free charge or ion constitutes a current within circuit 126. Ammeter 124 detects this induced current, thereby detecting the presence of radiating materials near radiation detector 100. In some embodiments, ammeter 124 detects direct current. In other embodiments, ammeter 124 detects a pulse current. In some embodiments, current detector 124 may additionally or alternatively include a charge sensitive amplifier suitable to detect pulse currents.

Figure 2:
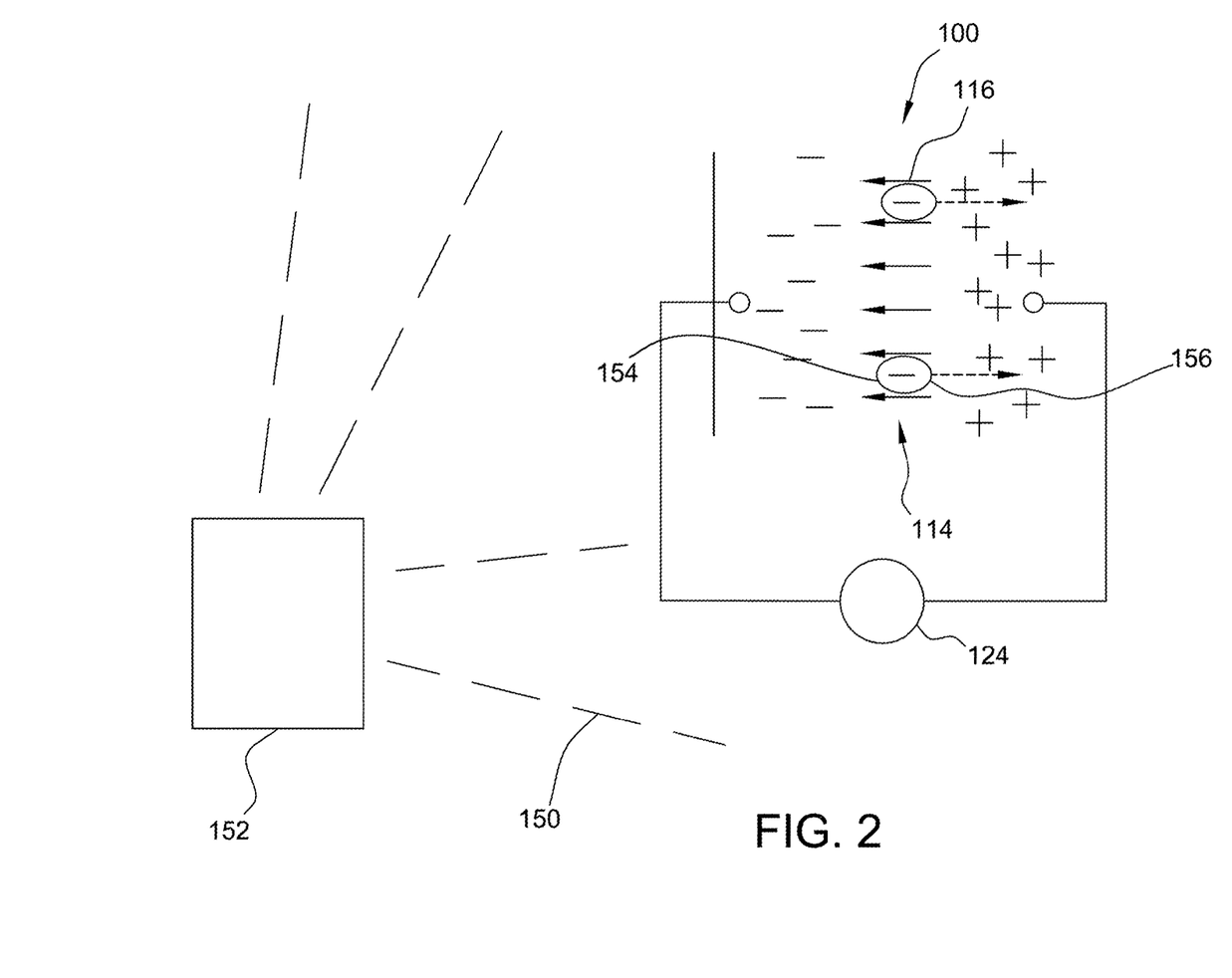
FIG. 2 illustrates detection of a free charge or ion generated by a radiation source using the radiation detector shown in FIG. 1.

In one particular example, as illustrated in FIG. 2, an operator or user of radiation detector 100 may place radiation detector 100 in a fluence of ionizing radiation 150. Ionizing radiation 150 is generated by a radiation source 152 and is detectable using radiation detector 100, as described herein. Ionized radiation products or negative ions 154 pass into separation of charge region 114. In the exemplary embodiment, radiation products 154 include beta particles (e.g., free electrons). Alternatively, radiation products 154 may include any particles detectable by radiation detector 100. Electric field 116 forces ions 154 in direction 156, which constitutes a flow of charge or current. Ammeter 124 detects the current, thereby confirming the presence of radiation source 152 in the vicinity of radiation detector 100. Accordingly, radiation detector 100 may be utilized for various applications, including, but not limited to, security applications (e.g., airport security, police investigations, border patrol, threat assessment, etc.), scientific applications, and medical applications.

It should be understood that ionizing radiation 150 can come from any direction towards radiation detector 100, such that radiation detector 100 functions as described herein irrespective of the orientation of radiation detector 100 with respect to radiation source 152. Moreover, it should be understood that positive ions (e.g., alpha particles, not shown) may also be detected by radiation detector 100 in the same way, and that the direction in which a positive ion would be forced by electric field 116 would merely be opposite to direction 156 illustrated in FIG. 2.

Figure 3:
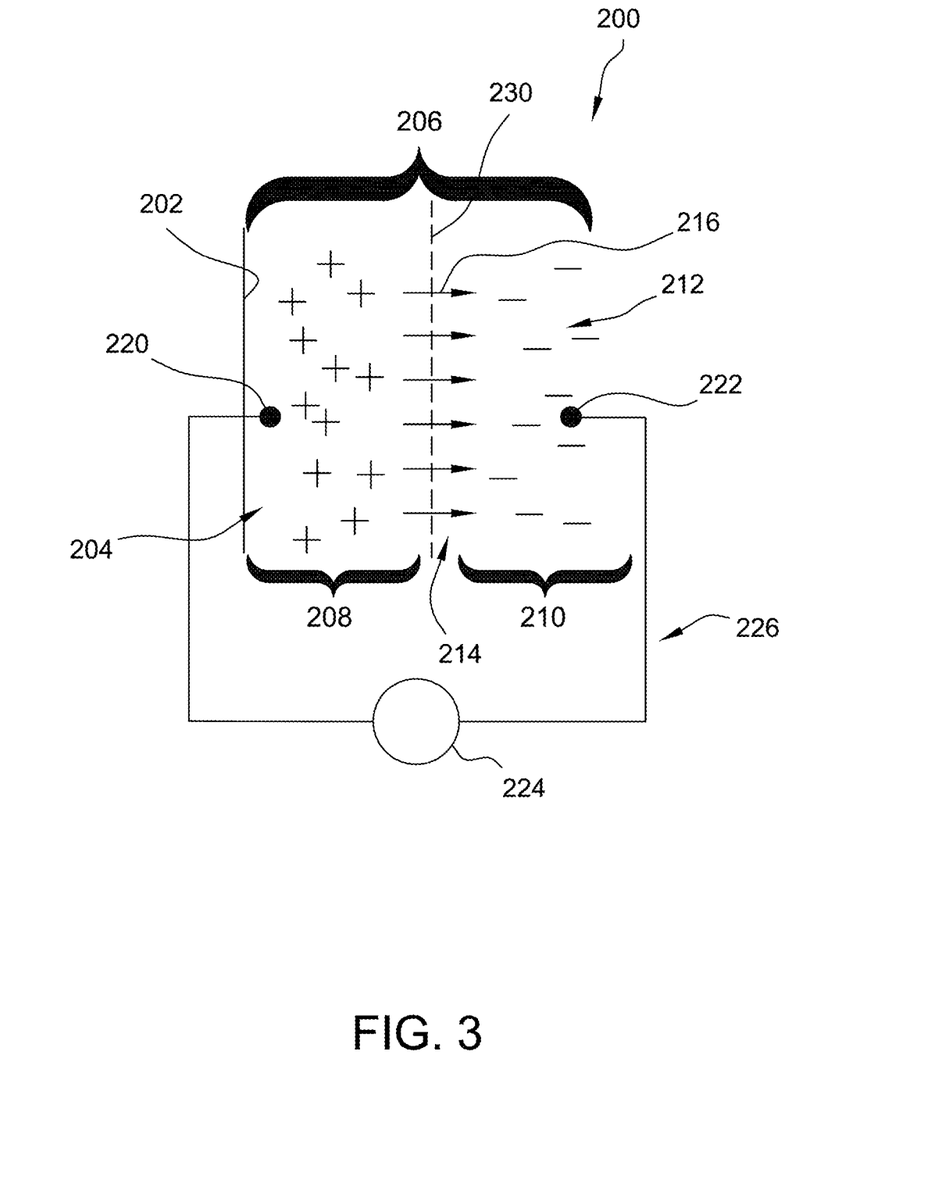
FIG. 3 is a diagram of another exemplary water-based radiation detector using a hydrophobic surface to create a positively charged exclusion zone.

FIG. 3 is a diagram of another exemplary water-based radiation detector 200 using a hydrophobic surface 202 to create a positively charged exclusion zone 204 (referred to herein as "positive exclusion zone 204"). In this embodiment, water 206 adheres to hydrophobic surface 202 to form structured water 208, thereby forming positive exclusion zone 204. Structured water 208 in positive exclusion zone 204 has a net positive charge. Accordingly, negative charge is forced from positive exclusion zone 204 into bulk water 210 in an adjacent water region 212 (a "negative water region" 212) just outside of positive exclusion zone 204. A separation of charge in a region 214 between positive exclusion zone 204 and negative water region 212 generates an electric field 216. Specifically, electric field 216 is generated between positive charge in positive exclusion zone 204 and negative charge in negative water region 212. It should be readily understood that a circuit 226 including a first electrode 220 in positive exclusion zone 204, a second electrode 222 in negative water region 212, and an ammeter 224 connected in series between first electrode 220 and second electrode 222 would function in much the same way as circuit 126 of radiation detector 100 (shown in FIG. 1). Electric field 216 would merely force the free charge or ion in the opposite direction than electric field 116 (also shown in FIG. 1), with respect to a centerline axis 230 defined through separation of charge region 214 in radiation detector 200. In other words, the polarity of the flow of the free charge or ion would reverse.

Figure 4A:
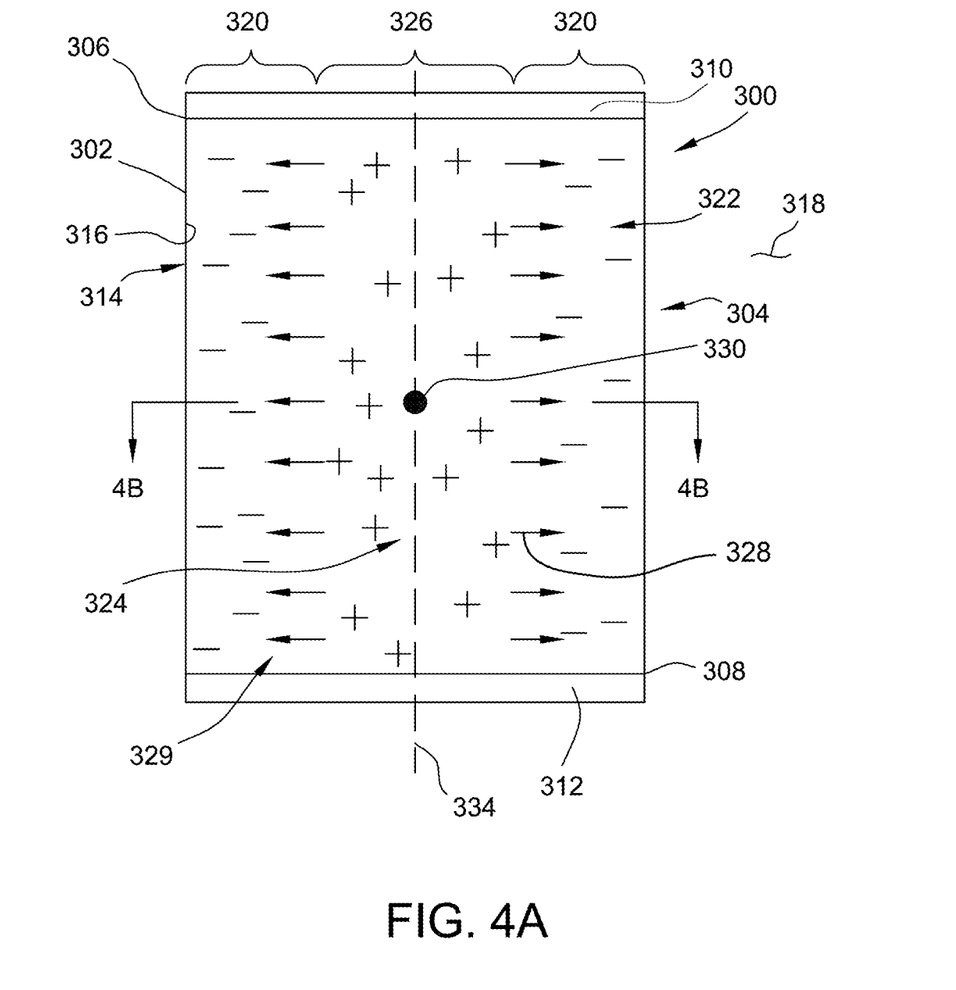
FIG. 4A is a side view of another exemplary water-based radiation detector with a cylindrical housing.
Figure 4B:
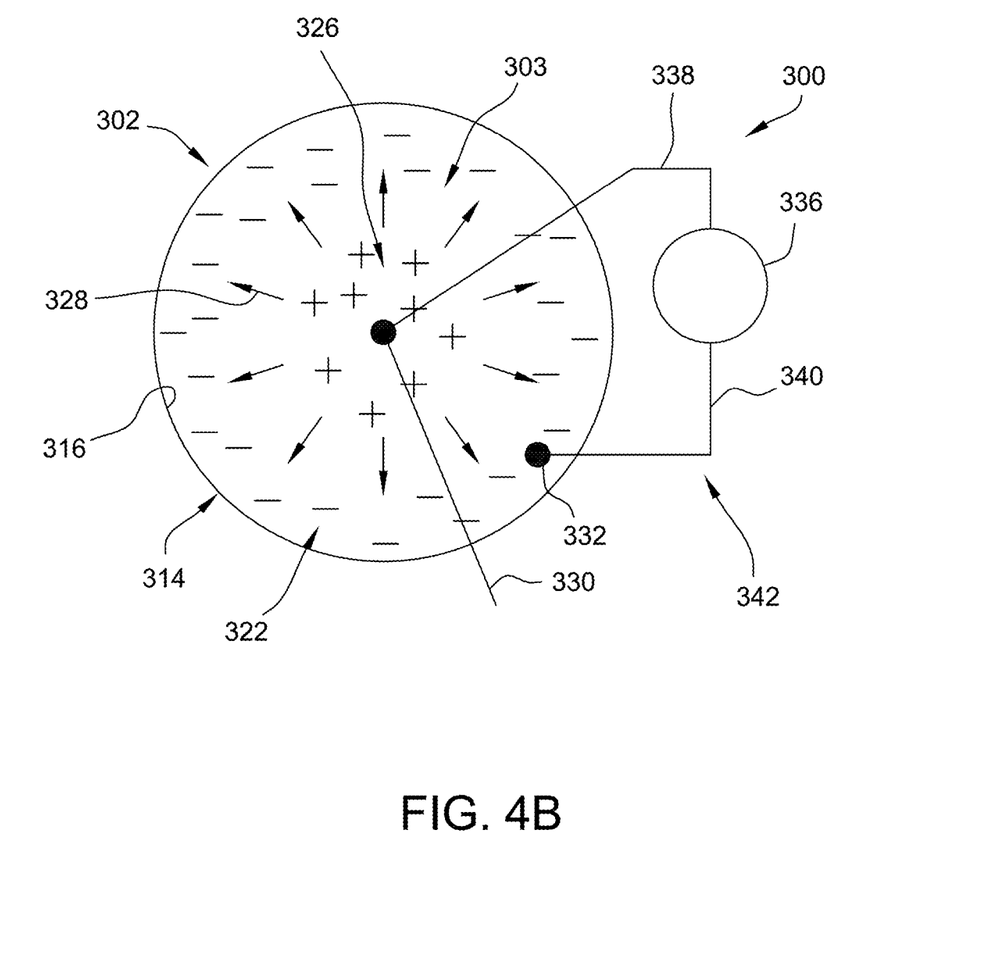
FIG. 4B is a cross-sectional view of the radiation detector shown in FIG. 4A.

FIGS. 4A and 4B are a side view and a cross-sectional view, respectively, of another exemplary water-based radiation detector 300. Radiation detector 300 includes a housing 302 configured to contain a volume of water 303. In the exemplary embodiment, housing 302 is shaped and sized such that radiation detector 300 is operable as a portable, hand-held device. For example, in one embodiment, housing 302 is substantially cylindrical, having a diameter between about 0.1 cm to about 5 cm and a length between about 0.1 cm to about 100 cm. Alternatively, housing 302 has any other shape, dimension(s), geometry, and/or configuration that enable radiation detector 300 to function as described herein. Moreover, although the embodiment of FIGS. 4A and 4B uses water 303 the primary medium within housing 302 (due to its structure-able nature), in one or more alternative embodiments, radiation detector 300 includes doped water. The doped water is doped with one or more ionic compounds in relatively small amounts such that the doped water is still structured as described herein. The doped water may facilitate adjusting a region of separation of charge within radiation detector 300 and/or an electric field generated therein.

Housing 302 includes a body 304 that extends between a first end 306 and a second end 308. First end 306 is plugged using a first plug 310, and second end 308 is plugged using a second plug 312, such that housing 302 is substantially liquid-impermeable. It should be understood that one of first end 306 and second end 308 is integral with body 304 in an alternative embodiment, such that the corresponding one of first plug 310 and second plug 312 is omitted. In addition, housing 302 includes an exterior surface 314 and an interior surface 316. Exterior surface 314 is adjacent an ambient environment 318 about radiation detector 300, and interior surface 316 is adjacent water 303.

In the illustrated embodiment, housing 302 is constructed from a plastic or polymeric material, such that interior surface 316 is a hydrophilic surface. Accordingly, interior surface 316 may be referred to herein as hydrophilic surface 316. As described herein, hydrophilic surface 316 causes water 303 adjacent to hydrophilic surface 316 to structure itself into structured water 320 having a net charge. Specifically, structured water 320 has a net negative charge in a negative exclusion zone 322. Negative exclusion zone 322 causes the formation of a net positive water region 324 in bulk water 326 adjacent thereto. An electric field 328 is formed in a region 329 of separation of charge between negative exclusion zone 322 and positive water region 324.

It should be understood that housing 302 may be constructed from any material suitable to contain water 303 and to create a structured water exclusion zone, as described herein. Accordingly, housing 302 may be constructed from any suitable hydrophobic or hydrophilic material.

Radiation detector 300 includes a first electrode 330 and a second electrode 332. First electrode 330 is positioned at a location along a longitudinal centerline 334 of housing 302, such that first electrode 330 is in electrical contact with positive water region 324. Second electrode 332 is positioned at a location adjacent to interior surface 316 of housing 302, such that second electrode 332 is in electrical contact with structured water 320 in negative exclusion zone 322.

Radiation detector 300 also includes an ammeter 336 connected in series between first electrode 330 and second electrode 332. In the illustrated embodiment, a first wire 338 (e.g., any conductive material electrically insulated from water 303) extends from first electrode 330 out of housing 302 (e.g., through first plug 310) to ammeter 336, and a second wire 340 extends from second electrode 332 out of housing 302 (e.g., through second plug 312 or body 304) to ammeter 336. Accordingly, first electrode 330, first wire 338, ammeter 336, second wire 340, second electrode 332, and water 303 form a current-detecting circuit 342. Current-detecting circuit 342 functions as described herein to detect current generated by the movement of free charges—generated by ionizing radiation from a radiation source—by electrical field 328 within radiation detector 300.

Figure 5A:
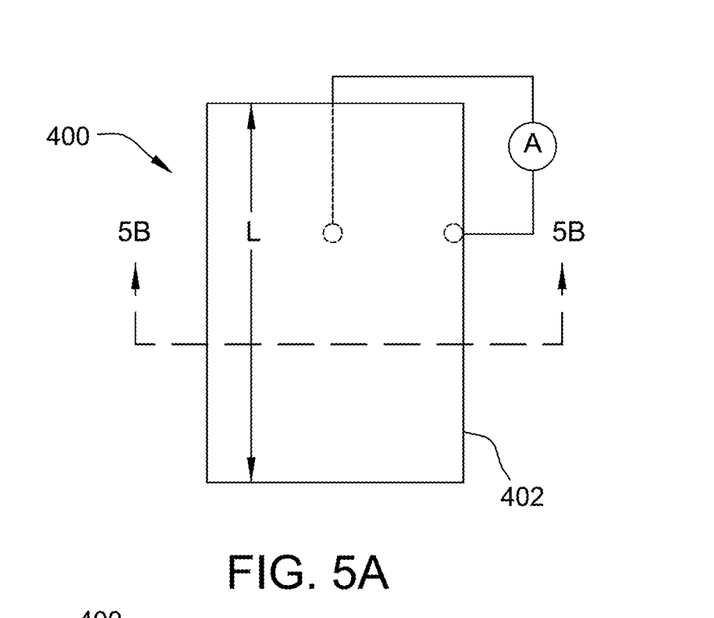
FIG. 5A is a side view of another exemplary water-based radiation detector with a rectangular prismatic housing.
Figure 5B:
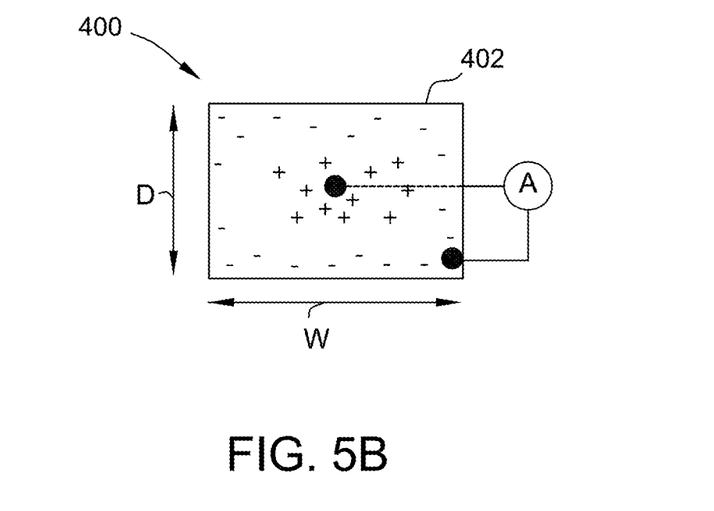
FIG. 5B is a cross-sectional view of the radiation detector shown in FIG. 5A.

FIGS. 5A and 5B are a side view and a cross-sectional view, respectively, of yet another exemplary water-based radiation detector 400. Radiation detector 400 is substantially similar to radiation detector 300 (shown in FIGS. 4A and 4B), except that a housing 402 of radiation detector 400 has a generally rectangular prismatic shape. In the exemplary embodiment, housing 402 is shaped and sized such that radiation detector 400 is operable as a portable, hand-held device. For example, in one embodiment, housing 402 is has a width W between about 0.1 cm to about 5 cm, a depth D between about 0.1 cm to about 5 cm, and a length L between about 0.1 cm to about 100 cm.

Figure 6A:
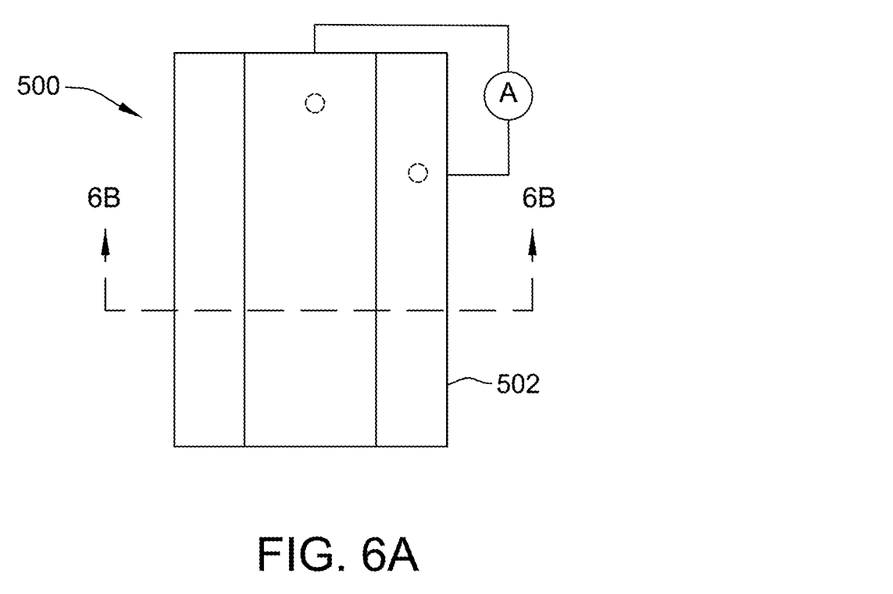
FIG. 6A is a side view of another exemplary water-based radiation detector with a hexagonal prismatic housing.
Figure 6B:
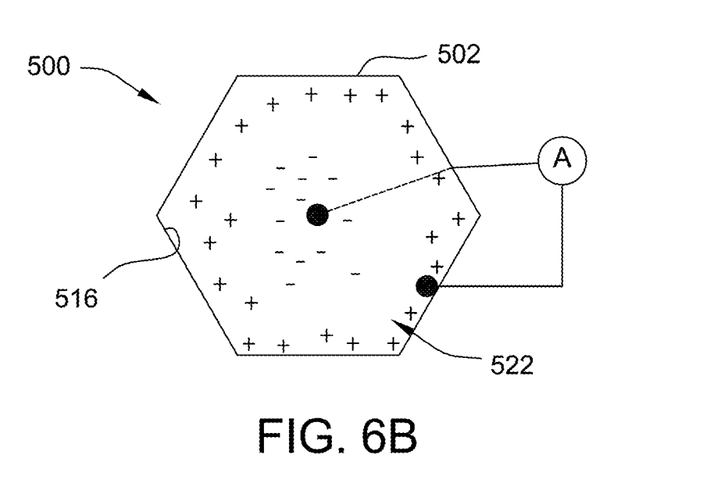
FIG. 6B is a cross-sectional view of the radiation detector shown in FIG. 6A.

FIGS. 6A and 6B are a side view and a cross-sectional view, respectively, of yet another exemplary water-based radiation detector 500. Radiation detector 500 is substantially similar to radiation detector 300 (shown in FIGS. 4A and 4B) and/or radiation detector 400 (shown in FIGS. 5A and 5B), except that a housing 502 of radiation detector 500 has a generally hexagonal prismatic shape. In addition, radiation detector 500 is implemented with a hydrophobic interior surface 516, such that radiation detector 500 includes a positively charged exclusion zone 522.

It should be readily understood that many other embodiments of a radiation detector employing the separation of charge between an exclusion zone and bulk water may be implemented without departing from the scope of the disclosure. For instance, radiation detectors may include additional components, such as a computing device configured to track or monitor a level of detected current, without departing from the scope of the present disclosure.

In addition, in embodiments of the present disclosure that include a hydrophilic surface (e.g., hydrophilic surface 102 of radiation detector 100, shown in FIG. 1), the hydrophilic surface may create larger exclusion zones (e.g., negative exclusion zone 104) compared to those exclusion zones created using hydrophobic surfaces. A larger exclusion zone leads to a greater degree of charge separation, which may improve the current detection capability of the radiation detectors disclosed herein.

Figure 7A:
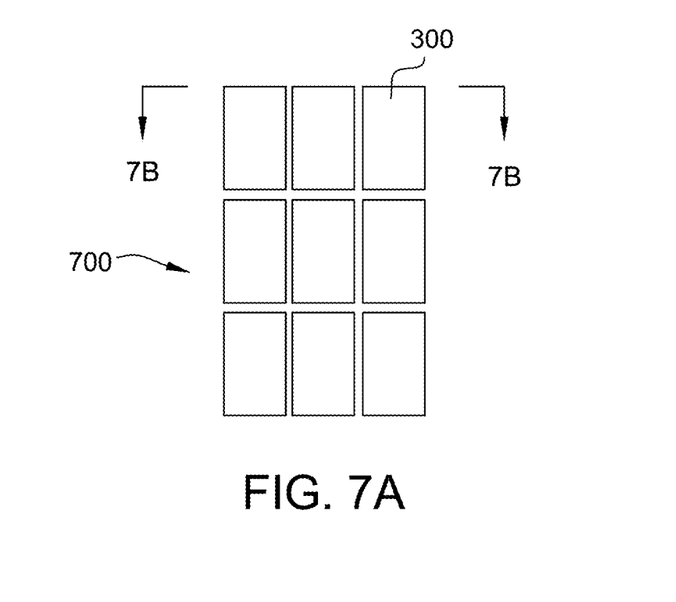
FIGS. 7A and 7B depict an array of the radiation detectors shown in FIGS. 4A and 4B.
Figure 7B:
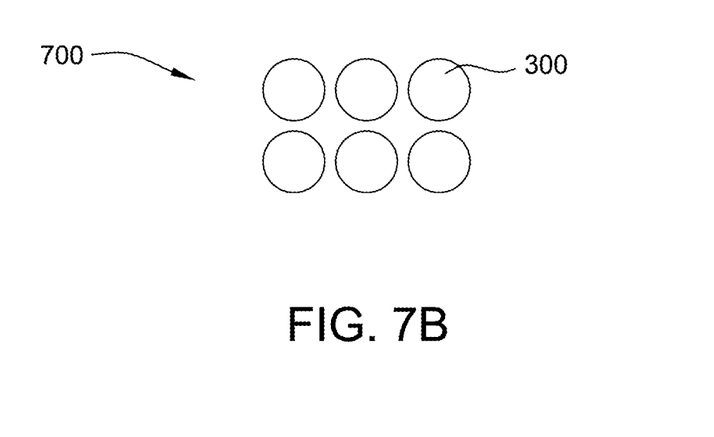

FIGS. 7A and 7B depict a side view and a top view, respectively, of a plurality of radiation detectors 300 (shown in FIGS. 4A and 4B) arranged in an array 700. Radiation detectors 300 may be similar to radiation detector 100 (shown in FIG. 1), radiation detector 200 (shown in FIG. 3), radiation detector 400 (shown in FIGS. 5A and 5B) and/or radiation detector 500 (shown in FIGS. 6A and 6B). Array 700 is implemented in certain embodiments to facilitate obtaining more information about a location of a radiation interaction, for example, to form an image of ionizing radiation from a radiation source.

In general, ionizing radiation may be incident on array 700 from any direction relative to array 700. In some cases, the direction of incident radiation is known a priori, and array 700 may be oriented in a particular way according to the specific application of radiation detection. In other cases, the direction of incident radiation is not known a priori. Array 700 may be used to detect the presence of a radiation source in an environment 702 therearound. Moreover, array 700 may be used to estimate or determine the position or direction, relative to array 700, of the radiation source. In the illustrated embodiment, array 700 is created from radiation detectors 300 arrayed in three directions (or dimensions), such that array 700 may resolve a radiation interaction in 3 directions (or dimensions).

Figure 8A:
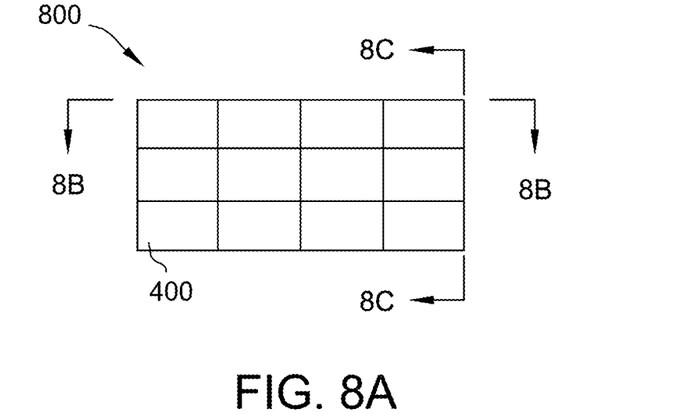
FIGS. 8A-8C depict an array of the radiation detectors shown in FIGS. 5A and 5B.
Figure 8B:
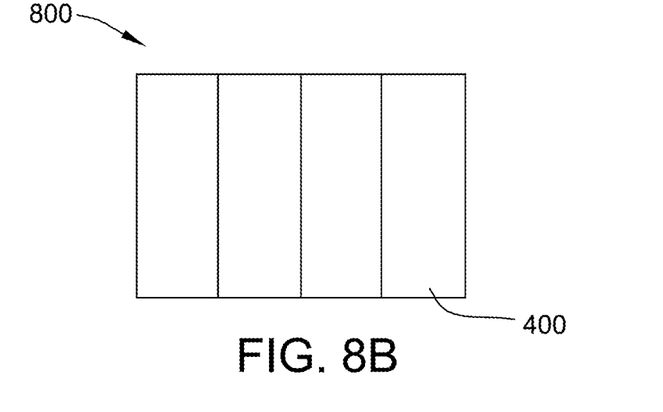
Figure 8C:
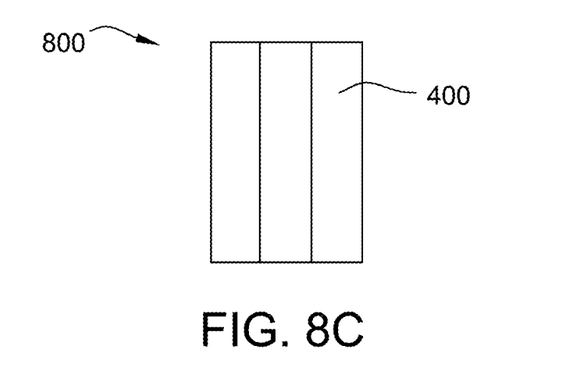

FIGS. 8A, 8B, and 8C depict top, first side, and second side views, respectively, of a plurality of radiation detectors 400 (shown in FIGS. 5A and 5B) arranged in an array 800. In the illustrated embodiment, array 800 is created from radiation detectors 400 arrayed in two directions (or dimensions), such that array 800 may resolve a radiation interaction in two directions (or dimensions). For instance, an array 800 in which radiation detectors 400 (also referred to as "detector elements" 400 within array 800) are arranged in two-dimensional array 800 may be used as an image-forming x-ray detector array in an x-ray imaging system (not specifically shown). In such an image-forming x-ray detector made from array 800, array 800 may include several hundred detector elements 400 in either direction. Generally, more detector elements 400 in a particular direction enables the x-ray detector to have a larger field of view to be imaged.

Figure 9A:
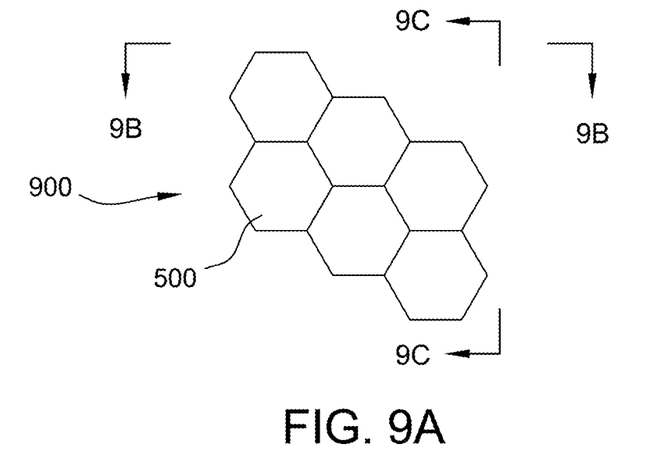
FIGS. 9A-9C depict an array of the radiation detectors shown in FIGS. 6A and 6B.
Figure 9B:
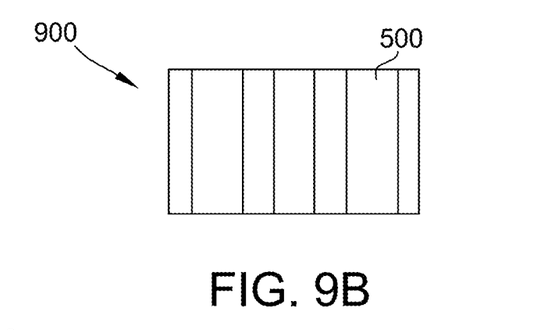
Figure 9C:
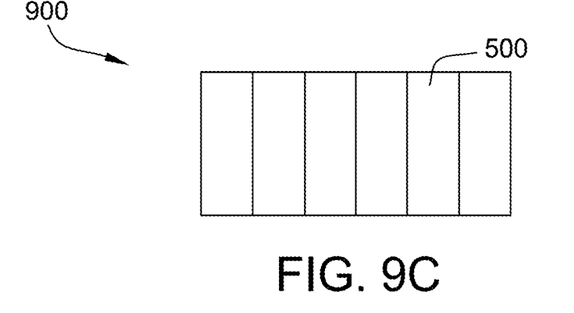

Similarly, FIGS. 9A, 9B, and 9C depict top, first side, and second side views, respectively, of a plurality of radiation detectors 500 (shown in FIGS. 6A and 6B) arranged in an array 900. In the illustrated embodiment, array 900 is created from radiation detectors 500 arrayed in two directions (or dimensions), such that array 900 may resolve a radiation interaction in two directions (or dimensions).

The particular geometry of radiation detectors 300, 400, 500 within an array 700, 800, 900 and accordingly the geometry of the array itself, may be selected based upon (i) the energy of the ionizing radiation being detected, expected to be detected, and/or desired to be detected; and/or (ii) the spatial resolution at which the array is expected to perform. In general, higher energy ionizing radiation requires a larger volume within each detector element to be effectively detected. Moreover, to achieve higher spatial resolution, it may be necessary to reduce the size of each detector element in a direction in which the high spatial resolution is desired.

Using the systems and methods described herein, a water-based radiation detector is configured to detect free charges or ions moving through an electric field generated by the structuring of water within the radiation detector. Accordingly, the systems and methods described herein facilitate a low-cost, re-usable, and scalable radiation detector.

Exemplary embodiments of methods and systems for detecting radiation are described above in detail. The methods and systems are not limited to the specific embodiments described herein, but rather, components of systems and/or steps of the methods may be utilized independently and separately from other components and/or steps described herein. Accordingly, the exemplary embodiment can be implemented and utilized in connection with many other applications not specifically described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A radiation detector comprising:
   a housing configured to contain a volume of water, said housing comprising an interior surface adjacent a first portion of said water having a first net charge, wherein said interior surface comprises one of (i) a hydrophilic surface such that the first net charge comprises a negative charge, and (ii) a hydrophobic surface such that the first net charge comprises a positive charge;
   a first electrode coupled to said housing within said first portion of said water;
   a second electrode coupled to said housing within a second portion of said water adjacent said first portion of said water; and
   a current detector connected in series between said first electrode and said second electrode, said current detector configured to detect a current associated with an ionized radiation product that enters said housing.

2. The radiation detector of claim 1, wherein said interior surface comprises said hydrophilic surface, and wherein said second portion of said water has a second net charge comprising a positive charge, such that an electric field is generated between said first portion of said water and said second portion of said water.

3. The radiation detector of claim 2, wherein the ionized radiation product that enters said housing is moved by the generated electric field, said current detector configured to detect the current of the ionized radiation product within said housing.

4. The radiation detector of claim 1, wherein said housing comprises a hydrophilic polymeric material that at least partially defines said hydrophilic surface.

5. The radiation detector of claim 1, wherein said interior surface comprises said hydrophobic surface, and wherein said second portion of said water has a second net charge comprising a negative charge, such that an electric field is generated between said first portion of said water and said section portion of said water.

6. The radiation detector of claim 1, wherein said housing comprises a hydrophobic polymeric material that at least partially defines said hydrophobic surface.

7. The radiation detector of claim 1 further comprising a first wire electrically coupling said first electrode to said current detector.

8. The radiation detector of claim 7 further comprising a second wire electrically coupling said second electrode to said current detector.

9. The radiation detector of claim 1, wherein said water comprises water doped with an ionic compound.

10. A method for constructing a radiation detector, said method comprising:
    dispensing a volume of water into a housing configured to contain the water, wherein the housing includes an interior surface adjacent a first portion of the water, wherein said interior surface comprises one of (i) a hydrophilic surface such that the first net charge comprises a negative charge, and (ii) a hydrophobic surface such that the first net charge comprises a positive charge;
    positioning a first electrode within the first portion of the water;
    positioning a second electrode within a second portion of the water adjacent the first portion of the water; and
    connecting a current detector in series between the first electrode and the second electrode, wherein the current detector is configured to detect a current associated with an ionized radiation product that enters the housing.

11. The method of claim 10, wherein the interior surface includes the hydrophilic surface, and wherein the second portion of the water has a second net charge including a positive charge, said dispensing causing an electric field to be generated between the first portion of the water and the second portion of the water.

12. The method of claim 10, wherein the interior surface includes the hydrophobic surface, and wherein the second portion of the water has a second net charge including a negative charge, said dispensing causing an electric field to be generated between the first portion of the water and the second portion of the water.

13. The method of claim 10, wherein positioning a first electrode within the first portion of the water comprises extending a first wire through the housing, the first wire connecting the first electrode to the current detector.

14. The method of claim 13, wherein positioning a second electrode within the second portion of the water comprises extending a second wire through the housing, the second wire connecting the second electrode to the current detector.

15. The method of claim 10 further comprising doping the water with an ionic compound.

16. A radiation detector comprising:
a housing configured to contain a volume of water, said housing comprising an interior surface adjacent a first portion of said water having a first net charge, wherein said interior surface comprises one of (i) a hydrophilic surface such that the first net charge comprises a negative charge, and (ii) a hydrophobic surface such that the first net charge comprises a positive charge; and
a circuit formed through said first portion of water and a second portion of water adjacent said first portion of water, said second portion of water having a second net charge with a polarity opposite the first net charge, said circuit comprising a current detector configured to detect a flow of charge from one of said first and second portions of water to the other of said first and second portions of water, the flow of charge associated with an ionized radiation product that enters said housing.

17. The radiation detector of claim 16, wherein said current detector comprises an ammeter.

18. A radiation detector comprising:
a plurality of detector elements arranged in an array, each detector element of said plurality of detector elements comprising:
a housing configured to contain a volume of water, said housing comprising an interior surface adjacent a first portion of said water having a first net charge, wherein said interior surface comprises one of (i) a hydrophilic surface such that the first net charge comprises a negative charge, and (ii) a hydrophobic surface such that the first net charge comprises a positive charge;
a first electrode coupled to said housing within said first portion of said water;
a second electrode coupled to said housing within a second portion of said water adjacent said first portion of said water; and
a current detector connected in series between said first electrode and said second electrode, said current detector configured to detect a current associated with an ionized radiation product that enters said housing.

* * * * *